Feb. 10, 1931.   H. W. BELL   1,791,520
VEHICLE SUSPENSION
Filed June 10, 1925   3 Sheets-Sheet 1
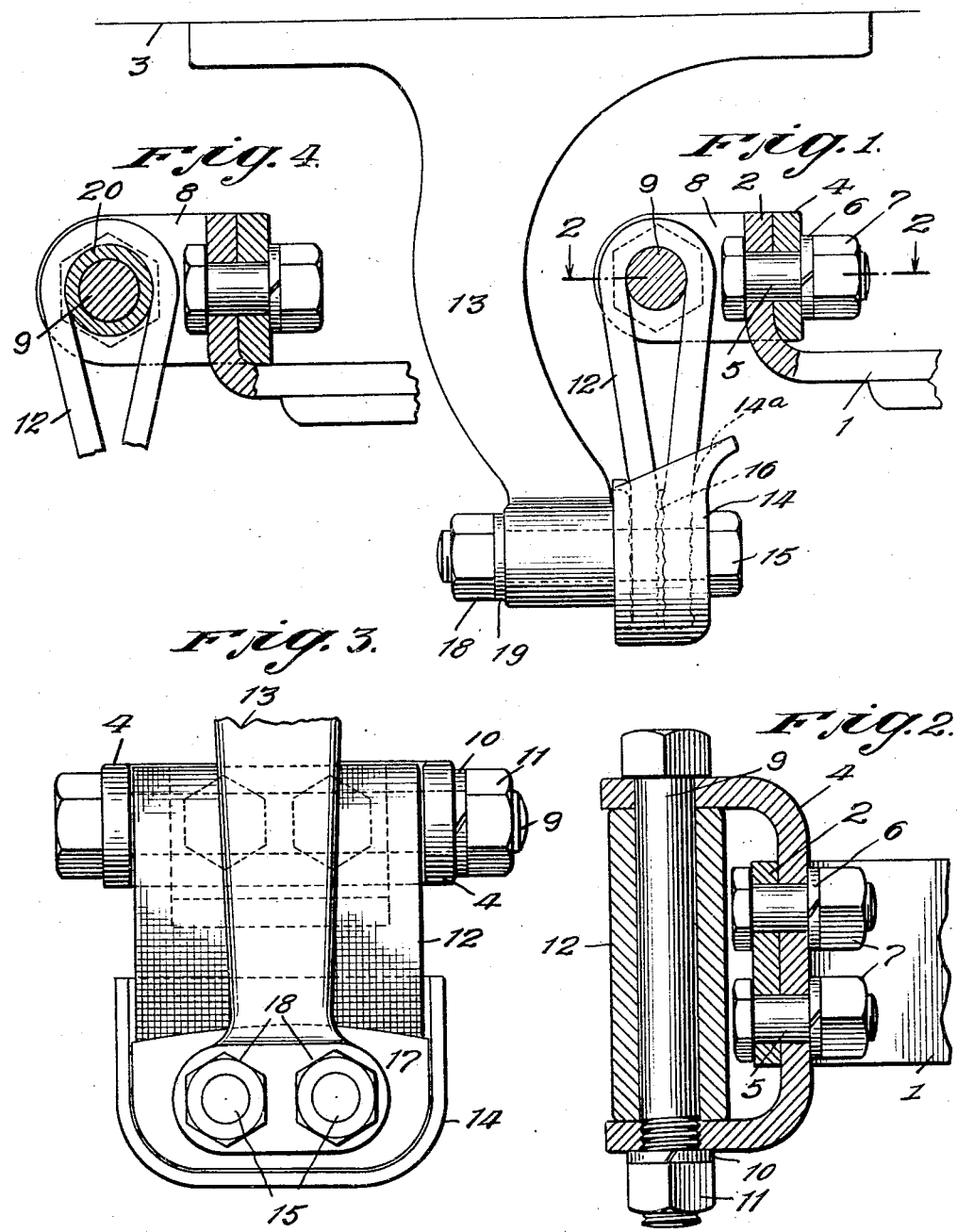

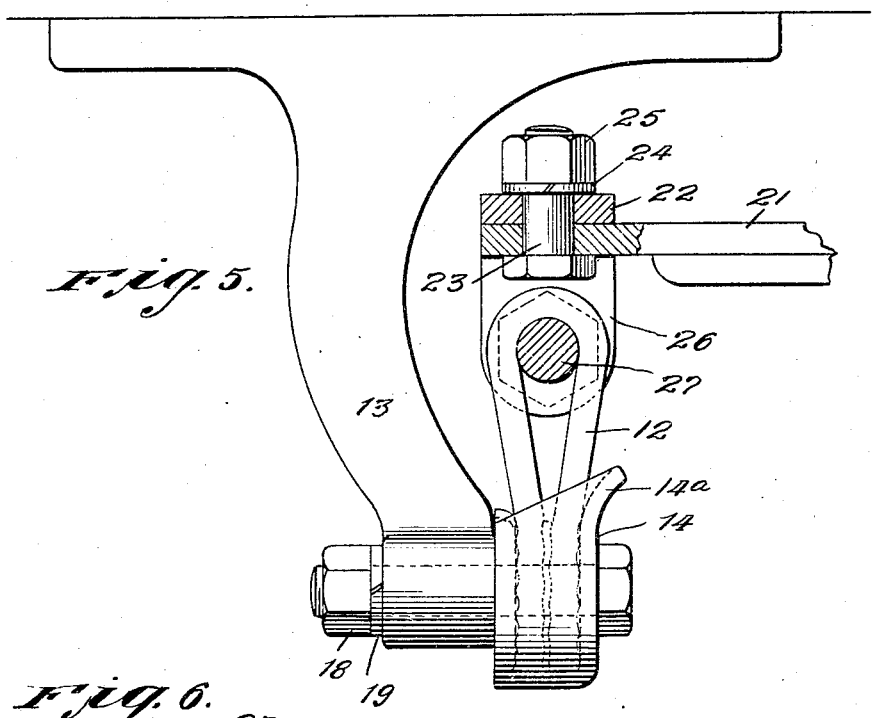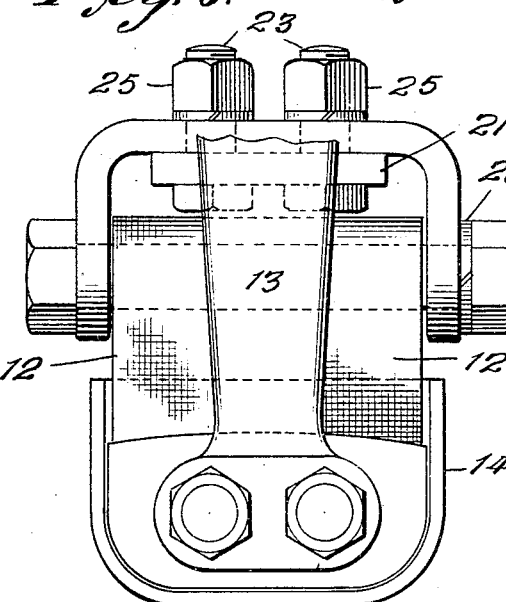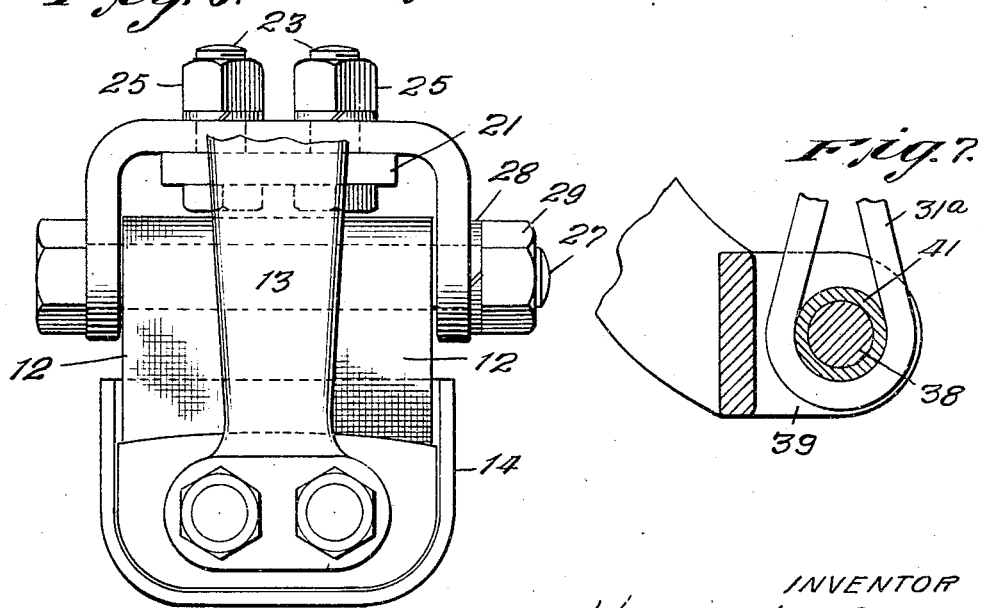

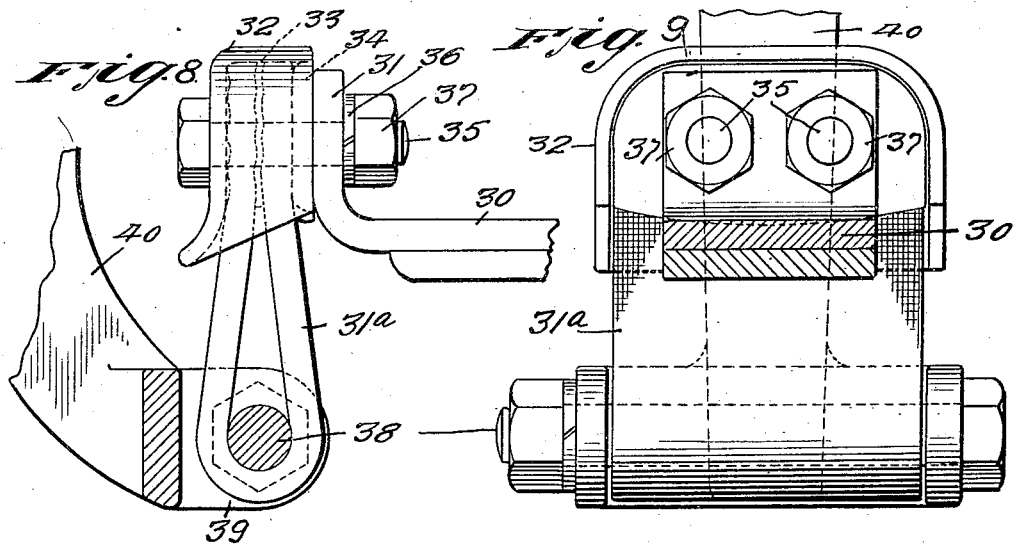
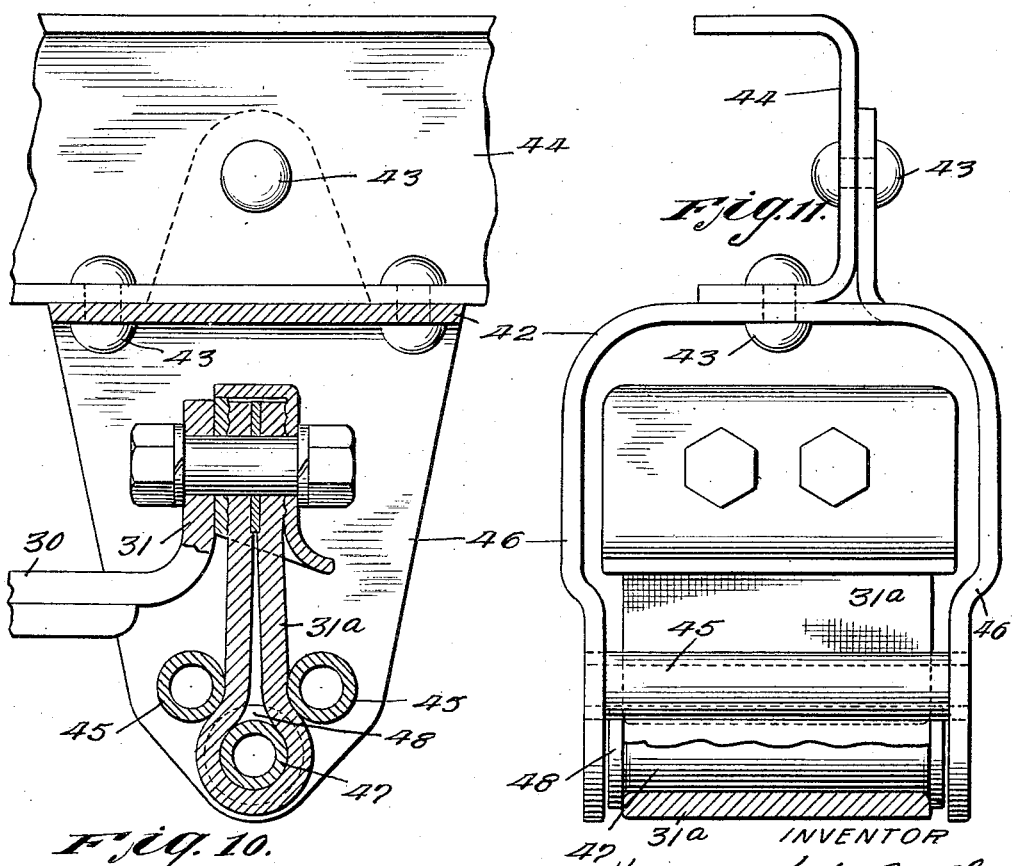

Patented Feb. 10, 1931

1,791,520

UNITED STATES PATENT OFFICE

HARVEY W. BELL, OF ARDSLEY-ON-THE-HUDSON, NEW YORK, ASSIGNOR TO THE BELOYT CORPORATION, OF NEW YORK, N. Y., A CORPORATION OF DELAWARE

VEHICLE SUSPENSION

Application filed June 10, 1925. Serial No. 36,249.

This invention relates to vehicle suspension systems and particularly to improved means for flexibly connecting the bodies of motor vehicles to the springs thereof, although certain features may be useful for other purposes.

It is an object of the invention to provide connecting means of the kind stated which will be reliable and quiet in operation and will require little or no lubrication. It is a further object to provide a connection of this kind in which the parts are few and simple and are therefore cheap to manufacture and install.

With these objects in view the connection between the vehicle body and a spring may desirably be effected in accordance with the present invention through a strap of flexible, substantially inelastic material rigidly clamped at its ends to either the vehicle body or the spring, and looped intermediate its ends around a part carried or held in place by the other of said members. Such looped strap is preferably led between side guides which prevent side play of the strap, so that the strap is effective to prevent sidewise movement of the body, and is not, itself, subject to rubbing wear. For the purpose of checking side play of the vehicle body the strap is made short and broad, its width preferably exceeding its length.

Other objects and advantages will hereinafter appear.

In the drawings:

Figure 1 is a fragmentary elevation, partly in section, showing one form of connection embodying features of the present invention;

Figure 2 is a horizontal section through said connection;

Figure 3 is an end elevation of the connection shown in Figure 1;

Figure 4 is a view similar to Figure 1 but showing another form of the invention;

Figures 5 and 6 are sectional side elevation and end views, respectively, of another embodiment of the invention;

Figure 7 is a vertical sectional view of a connection similar to the one disclosed in Figures 8 and 9, but employing a bushing in connection with the flexible connecting means;

Figures 8 and 9 are side and end elevations, partly in section, showing still another embodiment of the invention; and Figures 10 and 11 are side and end elevations, partly in section showing a further form of the invention.

In Figure 1 a laminated spring 1 supported from an automobile axle (not shown) has one of its leaves provided with an upturned perforate ear 2 through which connection is made to a vehicle body 3 for supporting the latter. A yoke 4 is rigidly secured to said spring ear 2, by means of a plurality of headed bolts 5 that pass through the yoke and the ear, and are made fast by lock washers 6 and nuts 7. The arms 8 of said yoke have aligned openings for horizontally supporting a nonrotatable bolt 9, that passes through them, has threaded connection with one of them, and is held in place by a lock washer 10 and nut 11. A strap 12 of strong, flexible, substantially inelastic material is looped around said bolt and extends downward therefrom, having its lower ends secured to the lower end of a bracket 13 depending from the body 3. Said strap is wide enough to substantially fill all of the space between the arms 8 of the yoke, is substantially unyielding in its flat plane, and is wider than it is long so that it permits only a very limited sidewise movement of the body. The strap is flexible and is also swingable in a fore and aft direction so that it permits free fore and aft relative movement of the spring end and body.

The lower ends of the strap 12 are received in a clamping box or cap 14 and are pierced to receive a plurality of headed bolts 15 whereby they are attached to the bracket 13. A washer 16 is interposed between the ends of the strap 12, and a clamping plate 17 is interposed between the bracket 13 and the strap 12. The surfaces of the cap 14, washer 16, and clamping plate 17 that engage the straps are preferably corrugated or otherwise frictioned, as shown, to grip the strap securely and over a large area. The bolts 15 pass through the clamping box 14, the ends of strap 12, the washer 16, the clamping plate 17, and longitudinal bores in the bracket 13, being drawn fast into place to clamp all of said parts firmly together by nuts 18, which are held against unscrewing by lock washers 19. The clamping box 14 is curved at its upper end as seen at 14a, to avoid cutting or wearing the strap as the strap is bent around it in the operation of the vehicle.

With the construction described, if the load on one side of the strap is substantially greater than on the other, the friction between the strap and the bolt will be overcome and the strap will adjust itself to equalize the weight on each end, but ordinarily there will be no rubbing surface. The weight at the upper end of the strap is distributed over a large area, so that the wear will be slow and substantially uniform.

The form of the invention shown in Figure 4 is like the form of Figure 1, with the exception that a bushing 20, wide enough to fill the space between the arms 8, is rotatably mounted on the bolt 9. This bushing supports and spaces the arms 8 of the yoke from one another, rigidly reinforces the bolt 9, and greatly increases the supporting surface at the upper end of strap 12. There is no rubbing of the strap upon the bushing at all, due to the fact that the bushing is freely rotatable on the bolt. The strap, therefore, is not subjected to any rubbing wear in this form.

In the form of the invention shown in Figures 5 and 6, the strap 12 and its connections to the bracket 13 are substantially the same as in Figure 1, but provision is made for locating the strap directly beneath the end of a spring 21. This construction obviates the provision of an upturned ear integral with a leaf of the spring. In this form of the invention a yoke 22 rests upon the end of spring 21 and is secured thereto by downwardly extending bolts 23 that pass through the spring and are held in place by lock washers 24 and nuts 25. The arms 26 of the yoke 22 extend downward and horizontally support a transversely extending, non-rotatable bolt 27 which is secured in place by a lock washer 28 and a nut 29. The strap 12 is looped around this bolt 27 and connects the spring to the body bracket 13.

In the form of invention shown in Figures 8 and 9 the spring 30 has a turned up ear 31 formed at its end. The ends of a looped strap 31a are connected fast to this ear by means of a clamping box 32, interposed washer 33, and clamping plate 34, all held in assembled relation by headed bolts 35 clamped tight by a lock washer 36 and nut 37. In this form of the invention the strap 31a is looped at its lower end around a bolt 38 carried by ears 39 formed on the lower end of a body bracket 40. This construction is very cheap to manufacture, because it obviates the provision of a yoke for supporting the bolt 38, the bolt being supported directly in the body bracket, and the strap being clamped directly on the spring at its upper end.

In Figure 7 there is shown a portion of a connection made like that of Figures 8 and 9, but in Figure 7 provision is made of a bushing 41 surrounding the bolt 38, and filling the space between the ears 39, for taking the wear and eliminating all rubbing upon the strap.

In the form of the invention shown in Figures 10 and 11, a U-shaped bracket 42 is secured by rivets 43 to the horizontal and vertical walls of a channel body member 44. A spring 30, like the one shown in Figure 8, has a strap 31a secured to its vertical ear 31 in the manner disclosed and described in connection with Figure 8. The strap 31a at its lower end passes between round tubular bars 45 carried by the legs 46 of the U-shaped bracket 42 and passes around a tubular spool or rod 47 below said rods 45. The rod 47 has flanges 48 at its ends for engaging the edges of the strap 31a, but these flanges are not of sufficient height to extend beyond the strap and contact with the bars 45. The bars 45 bear hard against the strap 31a and ordinarily prevent its movement around the spool 47. With this construction the strap will be substantially immovable with relation to the rod 47 so that its surface will not be allowed to rub back and forth upon the rod 47 nor upon the bars 45. As the spring is shortened and elongated under road stresses it moves the upper end of the strap back and forth but this does not shift the looped portion of the strap relatively to the rod 47 nor result in rubbing of the strap against the round bars 45. The strap merely bends about the bars 45, and as it is not substantially worn by such bending it will be very long lived.

Variations may be resorted to within the scope of the invention, and parts of the improvements may be used without others.

What I claim is:

1. In a vehicle suspension, the combination with spring and body members, of a spring shackle comprising a connecting link of flexible material rigidly clamped to one of said members and looped around the other, the link being shorter than it is wide and substantially unyielding in its flat plane to prevent side sway of the vehicle body.

2. In a vehicle suspension, the combination with spring and body members, of a yoke mounted on one of said members, a bolt joining the arms of said yoke, a flexible strap substantially unyielding in its flat plane looped around the bolt and clamped to the other of said members, said strap being wide enough to fill the space between the arms of the yoke and having greater width than length to prevent substantial sidewise movement of the body.

In testimony whereof I have affixed my signature.

HARVEY W. BELL.